United States Patent [19]
Uchida et al.

[11] Patent Number: 5,934,441
[45] Date of Patent: Aug. 10, 1999

[54] CONVEYING INSTALLATION

[75] Inventors: Hiroshi Uchida; Tatsuhiko Nakamura; Akira Takanaga, all of Hyogo, Japan

[73] Assignee: Itoh Electric Company Limited, Hyogo, Japan

[21] Appl. No.: 08/769,122

[22] Filed: Dec. 19, 1996

[30] Foreign Application Priority Data

Dec. 28, 1995 [JP] Japan ..................... 7-353659

[51] Int. Cl.⁶ .............. B65G 47/52; B65G 47/00
[52] U.S. Cl. ............... 198/370.03; 198/370.01; 198/786; 492/30; 492/39
[58] Field of Search .............. 198/370.03, 370.01, 198/786; 492/30, 35, 38, 39

[56] References Cited

U.S. PATENT DOCUMENTS

| | | |
|---|---|---|
| 1,217,919 | 3/1917 | Coryell ..................... 198/786 |
| 2,515,404 | 7/1950 | Grosvenor .................. 198/786 |
| 3,356,236 | 12/1967 | Shaw et al. . |
| 3,370,685 | 2/1968 | Guilie . |
| 4,872,247 | 10/1989 | Nakamura et al. ............ 492/39 |

FOREIGN PATENT DOCUMENTS

| | | | |
|---|---|---|---|
| 67249 | 1/1944 | Norway | .................. 492/39 |
| 617635 | 6/1980 | Switzerland . | |

*Primary Examiner*—Janice L. Krizek
*Assistant Examiner*—Thuy V. Tran
*Attorney, Agent, or Firm*—Wood, Phillips, VanSanten, Clark & Mortimer

[57] ABSTRACT

The invention provides a conveying installation capable of discharging specific commodity out of conveying lines, which features decreased number of component parts and ease assemble structure. In consideration of unification of component parts, the invention provides such a conveying installation being compatible with conveying systems having a variety of width using fewer kinds of component parts. The conveying installation incorporates a roller-shaped rotary body 11 to which ring bodies 12 are secured. Axial lines of respective ring bodies 12 are eccentric and inclined against axial line of the roller-shaped rotary body 11, and yet, adjoining ring bodies 12 respectively have 120° of phasewise difference.

33 Claims, 12 Drawing Sheets

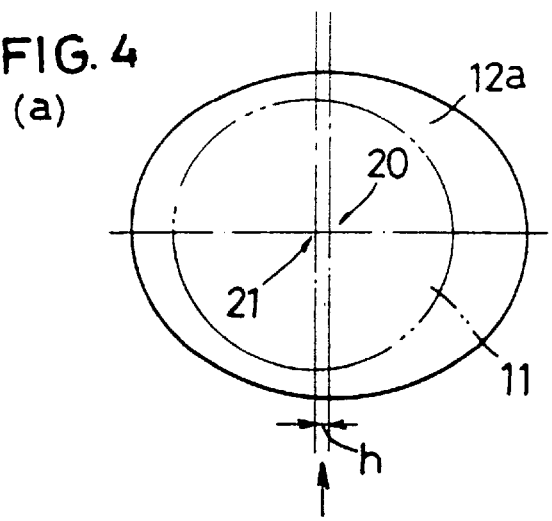
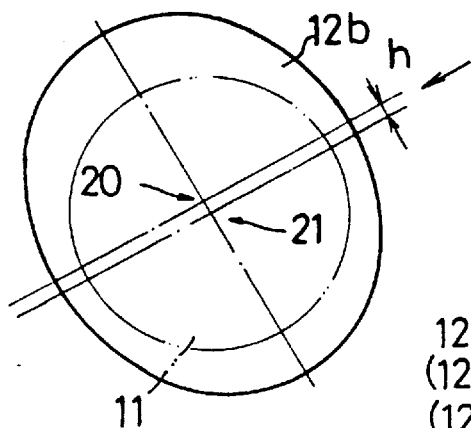
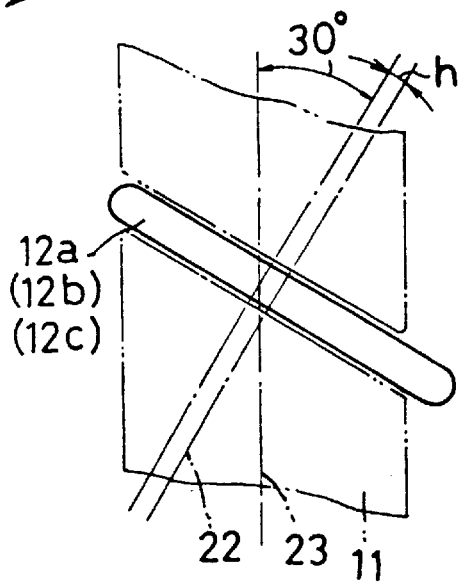
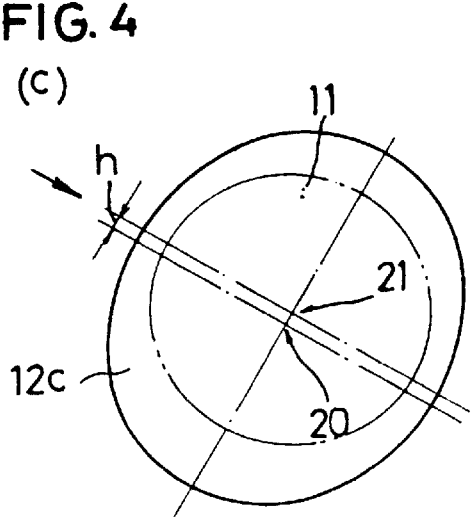

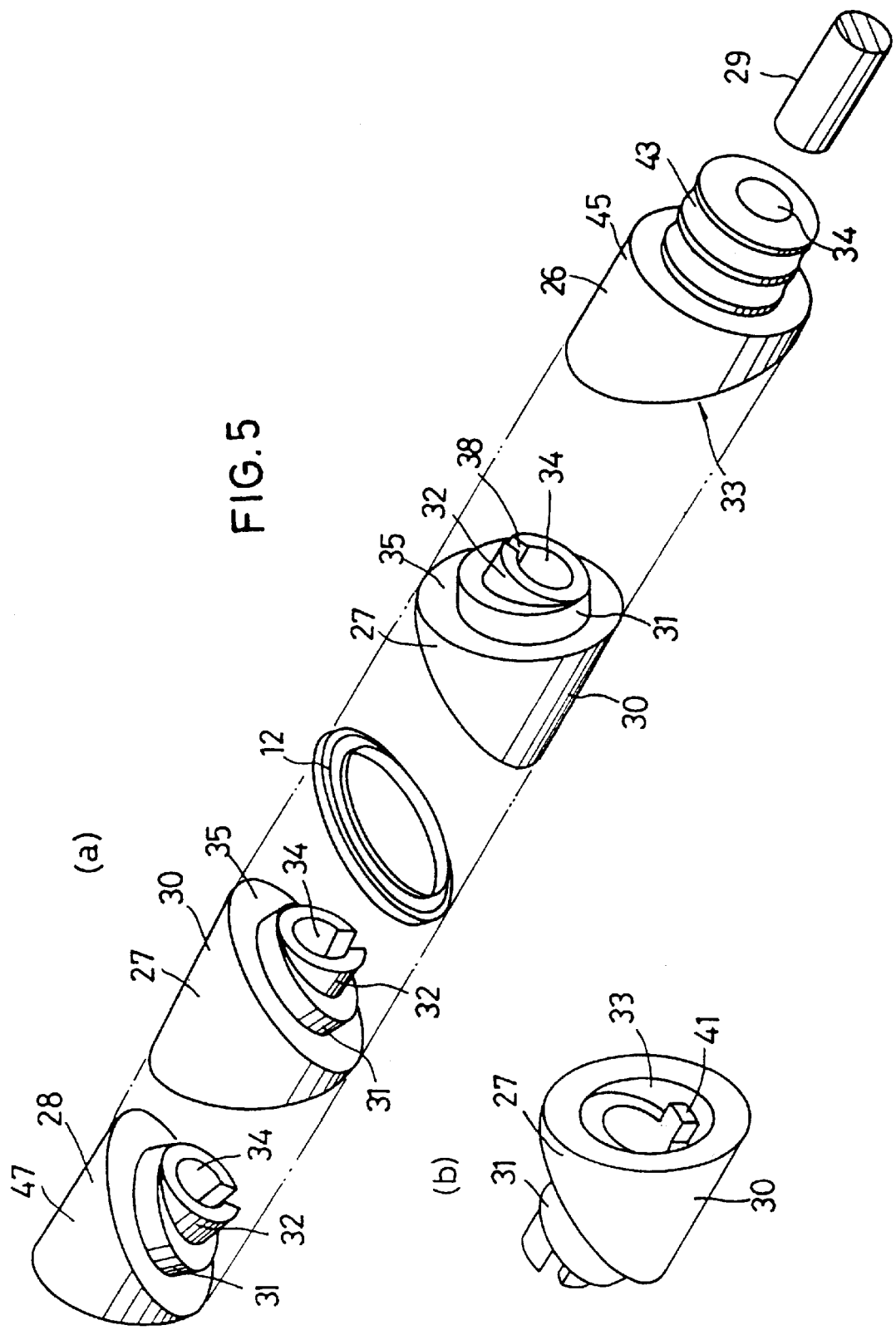

CONVEYING INSTALLATION

BACKGROUND OF THE INVENTION

1. Field of the invention

The present invention relates to a conveying installation provided with a number of rollers for conveying commodities, more particularly to a conveying installation capable of automatically discharging sorted commodities from conveying lines. The conveying installation according to the invention is capable of composing orthogonally intersecting conveying lines by way of using them at a corner of conveying route.

2. Description of Related Art

In any of automated factories, commodities are automatically conveyed on conveying lines by a conveying installation. Generally, any conveying installation disposes a number of rollers to allow commodities to be conveyed smoothly in accordance with rotation of the rollers.

Recently, in order to automatically sort commodities, there is a demand for replacing commodities on a conveying installation onto another conveying installation or delivering specific commodities to a warehouse or boxes from a conveying installation to store them. As a conveying device having a specific structure for discharging commodities, a cluster for a loading/unloading conveyer is disclosed in the Laid-Open Japanese Patent Publication No. HEI3-46906 of 1991. Each main body of the cited cluster is provided with a number of small rollers at 45° of angle, where a plurality of main bodies are secured to a rotating shaft at intervals. By hindering movement of commodities on the cited cluster, commodities can be discharged in the orthogonal direction from the conveying line.

As another installation for discharging commodities from a conveying line, a conveying installation called "cross module" is used.

Concretely, several of thin-width belt conveyors are disposed between rollers composing a main flow for example to have belt conveyors ascend or descend by operating pneumatic cylinders, thus composing the cross-module. When operating the cross-module, a belt conveyer is lifted above rollers of main flow at the moment when a specific commodity has just arrived above the belt conveyer, and then the commodity is placed onto the belt conveyer by having the belt conveyer scoop up the commodity, and finally the commodity is discharged in the direction orthogonally intersecting the convey line.

The above-cited conveying installation can discharge a specific commodity out of the conveying installation, and yet, exerts own capability to effectively sort commodities.

Nevertheless, among those conveying installations based on conventional art, since the above-cited cluster for a loading/unloading conveyer disposes a number of small rollers in the periphery of main bodies, it is essential that a number of small rollers and pins for rotating the small rollers be provided for the cluster system, thus requiring a large number of parts as a defective point. Moreover, since any of conventional conveying installations needs to assemble small rollers and pins in narrow locations by tightly aligning them, assembly work entails difficulty. Moreover, since any of convention-al conveying installations is provided with a number of parts, and yet, since a number of parts are disposed in small locations, there is discontent against them because of easily breakable structure.

Even the above-cited conveying installation called "cross module" entails difficulty in the assembly work because belt conveyors are disposed between narrow space provided for rollers and yet a number of easily breakable parts such as pneumatic cylinders are also provided therefor.

SUMMARY OF THE INVENTION

The object of the invention is to provide a novel conveying installation capable of discharging a specific commodity from a conveying line wherein it features reduced number of parts, easy assembly work, and hardly breakable structure.

It is another object of the invention to provide a novel conveying installation being compatible with conveying devices having a variety of width using fewer kinds of parts in consideration of unification of parts.

The conveying installation according to the invention comprises a shaft-like or roller-like rotary body rotatable on receipt of power in order to convey commodities by placing them on said rotary body, which is provided with at least one of ring bodies each having axial line being eccentric and slant against the axial line of rotary body.

In the conveying installation according to the invention, ring bodies are set to each rotary body. In principle, the ring bodies are freely rotatable. However, since some friction is generated between the ring bodies and the rotary body, and yet, since the axial line of each ring body is eccentric against that of the rotary body, each ring body can resist force against the direction of the rotation of the rotary body to some extent.

Because of this, when the rotary bodies are rotated after setting commodities on the conveying installation of the invention, commodities are delivered to the downstream side of the conveying installation.

When discharging commodities out of the inventive conveying installation, an obstructing object is placed on the conveying installation to compulsorily stop commodities on the installation.

Mechanical operation of the conveying installation at the time of stopping the commodities is described below.

Concretely, in the structure of the inventive conveying installation, since the axial line of ring body is eccentric against the axial line of the rotary body, when the rotary body rotates, regardless of the rotation or halt of the ring body, the ring body rotatably comes into contact with the rotary body and moves itself. Accordingly, as was described above, when a commodity is compulsorily halted on the conveying installation, the ring body intermittently strikes bottom of the commodity upward.

In addition, according to the inventive conveying installation, since the axial line of the ring body is inclined against the axial line of the rotary body, the ring body has axial-directional shifting component. Accordingly, when the ring body makes a relative turn against the rotary body, a certain point of the ring body shifts in the axial direction of the rotary body.

Considering such a case in which a commodity is compulsorily brought into a stop on the above-cited conveying installation, rotation of the ring body is brought into a stop by the halt of the commodity. However, since the rotary body is still rotated by power, the ring body is rotated relative to the rotary body. Accordingly, since a specific point on the ring body brought into contact with the commodity shifts in the axial direction, any commodity which is placed on the ring body is subject to receive an axial-directional force.

In the case of the inventive conveying installation, whenever a commodity is compulsorily halted on the conveying installation, the above-described intermittent strike of the ring body against the commodity and axial-directional shifting of said point are simultaneously performed. Accordingly, the commodity is conveyed in the axial direction by the ring body at the time of upward strike performed by the ring body against the commodity. On the other hand, while the ring body makes no striking movement, the commodity remains still at the halted position. When the ring body makes the consecutive striking movement, the commodity is again shifted and this operation is repeated. Accordingly, commodities are sequentially discharged out of the conveying installation.

Another invention modified from the above-described inventive art provides a novel conveying installation comprising a plurality of ring bodies provided for each rotary body wherein one or a group of the ring bodies respectively has an axial line with eccentric direction being different against the center of the rotary body.

The conveying installation according to the invention intermixedly incorporates some number of ring bodies having eccentric directions of axial lines being different from each other. Concretely, a certain ring body is eccentric in the direction of 12 o'clock (0°), whereas another ring body is eccentric in the direction of 4 o'clock (120°), and another one is eccentric in the direction of 8 o'clock (240°), for example.

As was described earlier, as a result of becoming eccentric, the ring body comes into contact with the rotary body and intermittently strikes a commodity upward. In particular, according to the invention, since ring bodies each having different eccentric direction are intermixed, each commodity is pushed upwards by respective ring bodies via different timing. Accordingly, commodities are subject to minimum amplitude of vertical vibration to be discharged from the conveying installation smoothly.

The invention discretely added with an improvement in pursuit of the object identical to that of the above-referred invention provides a novel conveying installation wherein a plurality of ring bodies are set to the rotary body and yet one or a group of the ring bodies respectively has a phase of inclined angle of axial line being different from each other.

The difference of phases of inclined angles means that, even though inclined angles of the ring bodies are totally identical to each other for example, those ring bodies having postures being different from each other intermix among them. An explanation is given below by taking a case in which inclined angles of the ring bodies are totally identical to each other for example. Posture of a specific ring body in the case of halting the rotary body at a reference rotating angle and posture of rotating angle of another specific ring body are different from each other. However, posture of a specific ring body at the reference rotating angle exactly corresponds to the posture of another specific ring body when rotating the rotary body by 120° for example.

In the conveying installation according to the invention, since the ring body generates difference in phases of inclined angles, a commodity is led by a specific ring body at a certain time, which is then led by another ring body to enable the commodity to be shifted smoothly.

In particular, multiplied effect can be expected when coupling the above-referred structure intermixedly disposing those ring bodies having eccentric directions of axial lines being different from the center of the rotary body with the above-referred structure intermixedly disposing those ring bodies having phases of inclined angles of axial lines being different from each other.

Concretely, each commodity is pushed upward based on variable timings according to respective ring bodies and then conveyed in the axial direction of the rotary body by the ring body. When the ring body leaves the commodity via rotation, another ring body having differential phase in the inclined angle pushes the commodity upward, and thus, the commodity is conveyed in the axial direction while being relayed by another ring body. In other words, the commodity is conveyed in the axial direction by way of riding across ring bodies in succession.

Another point of improvement is characterized by provision of ring bodies being coaxial with the rotary body.

Since the inventive conveying installation incorporates a coaxial ring body, as a result of rotating the rotary body, when the ring body having an inclined angle remains in a state recessed from a commodity, the commodity can be supported by the coaxial ring body. When the ring body having an inclined angle again pushes the commodity upward, the commodity is again shifted in the lateral direction.

Improvement has been achieved to promote interchangeability of parts. The inventive rotary body is structured by combining a plurality of block members. Each block member comprises an external peripheral portion being coaxial with axial line of the block members and a ring-body mountable portion having external diameter being narrower than that of the external peripheral portion and an axial line being eccentric and inclined against the axial line of the block members. Edge portions of the block members are respectively provided with coupling portions, whereby respective block members are connected to each other via coupling of the coupling portions of the edges of respective block members. A number of ring bodies are set to the ring body mountable portions.

According to the invention, a rotary body can be manufactured by interlinking the block members. It is also possible to manufacture rotary bodies each having different length by increasing or decreasing the number of the block members.

In the structure of the improved conveying installation comprising the block members, positioning devices are set to both edges of the block members. Adjoining block members are linked with each other in the state in which eccentric directions and phases of inclined angles of the ring-body mountable portions are different from each other.

Since the block members of the inventive conveying installation are respectively provided with positioning devices, the block members can be connected in the state in which eccentric direction and inclined angles are different from each other.

According to the invention added with further improvement, a through-hole is formed in the center of each block member, wherein an axial core is inserted through a continuous hole formed by linkage of the block members.

According to the inventive conveying installation, bending moment applied to respective rotary bodies can be borne by the axial core set in the center of the block members. Thus, the inventive conveying installation can be endured for heavy conveying commodities.

Another improved structure comprises block members each having power-transmission members, wherein these block members are positioned to edge portions of the rotary bodies.

The power-transmission members of the inventive conveying installation can be made with the block members, thus further facilitating interchangeability of parts.

BRIEF DESCRIPTION OF THE DRAWINGS

FIG. 4 is explanatory of positionwise relationship between ring bodies of the roller-shaped rotary body;

FIG. 5(a) is an analytical perspective view of the roller-shaped rotary body used for the conveying installation shown in FIG. 1.

FIG. 5(b) is a perspective view of an intermediate block member as seen from the back side;

DESCRIPTION OF THE PREFERRED EMBODIMENTS

Figure 1:
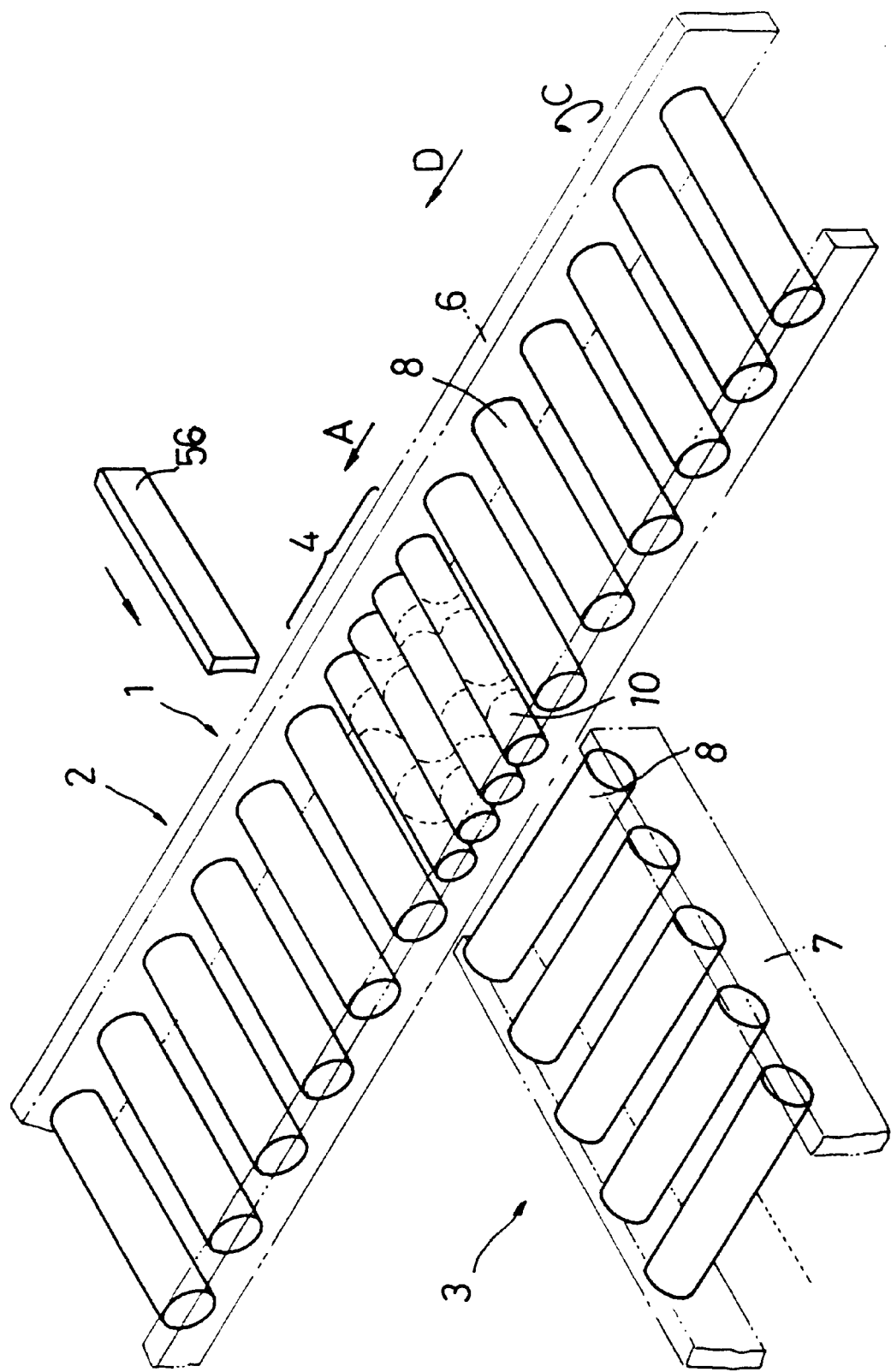
FIG. 1 is a perspective view of the novel conveying installation exemplifying an embodied state of the invention.

Referring to FIG. 1, the reference numeral 1 designates a conveying installation according to an embodiment of the invention. The conveying installation 1 comprises main conveying portions 2 forming main flows and sub-conveying portions 3 branched from the main conveying portions 2. The main conveying portion 2 and the sub-conveying portions 3 of the conveying installation 1 are respectively called "roller conveyer" provided with frames 6 and 7 each having a number of rollers 8 and 10 disposed thereon.

According to the invention, two kinds of rollers 8 and 10 are introduced.

Rollers 8 provided for many of the main conveying portions 2 and all of the sub-conveying portions 3 are identical to those which are used for any of conventional roller-conveyors. Each roller 8 is of cylindrical configuration and rotatable on receipt of power transmitted from a motor (not shown). It is also possible to introduce self-rotatable rollers 8 each incorporating a compact motor therein. In this embodiment, specially structured rollers 10 are provided for branching portions 4 of the main conveying portions 2, where each branching portion 4 belongs to the main conveying portion 2 and remains in contact with the sub-conveying portion 3.

Figure 2:
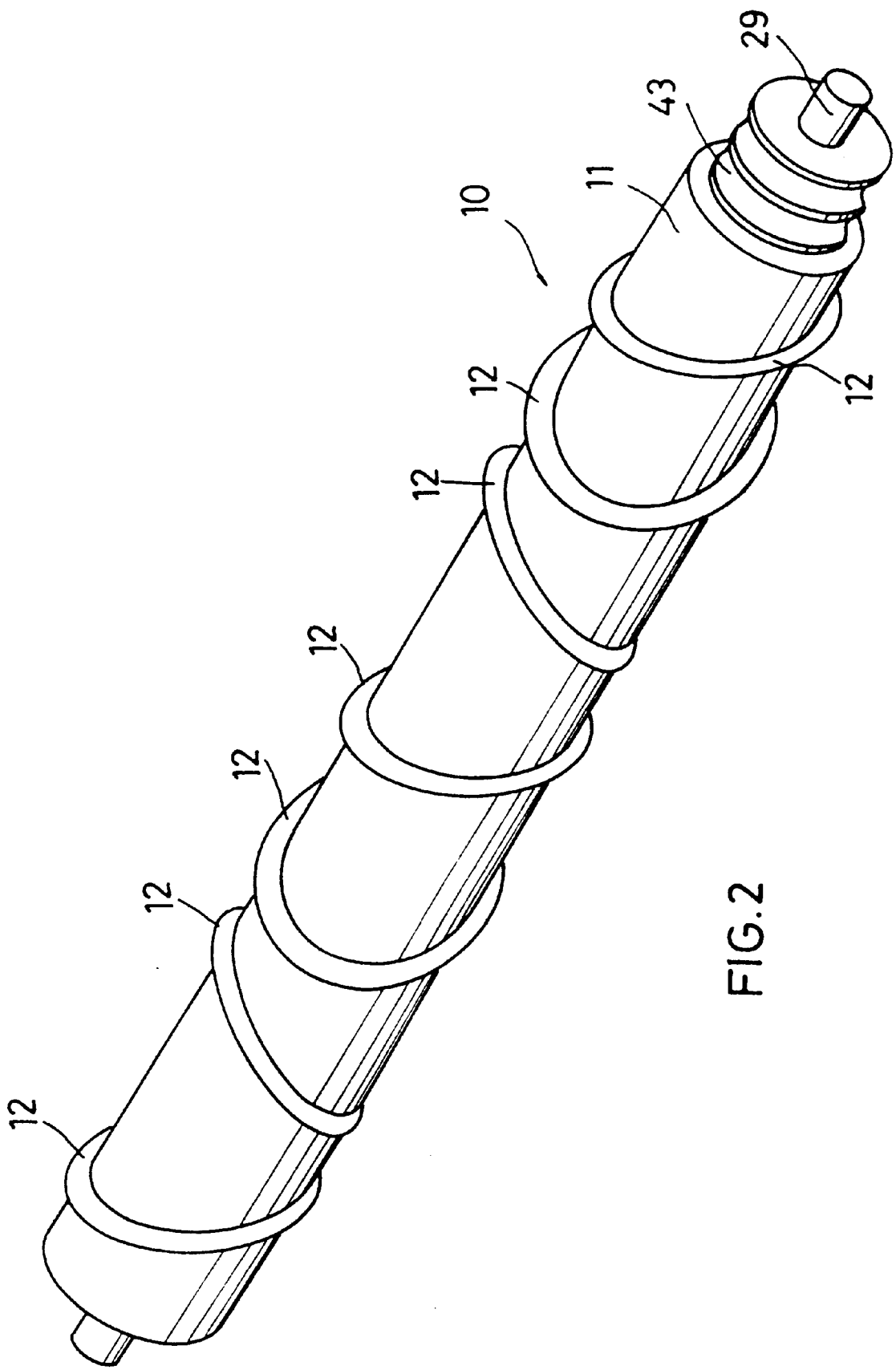
FIG. 2 is a perspective view of a roller-shaped rotary body used for the conveying installation shown in FIG. 1.

The specially structured roller 10 has a configuration shown in FIG. 2. Seven units of ring body 12 are secured to a roller-shaped rotary body 11 at equal intervals. The roller-shaped rotary body 11 is supported via a bearing 13 of the frame 6. A double pulley 43 is secured to an end of the roller-shaped rotary body 11, which is rotatable on receipt of power transmitted from a motor (not shown).

The ring bodies 12 are respectively made from resin such as nylon and annularly formed. The ring bodies 12 are respectively built in external circumferential surface of the roller-shaped rotary body 11 and freely rotatable relative to the roller-shaped rotary body 11.

In the aspect of positional relationship between the ring bodies 12 and the roller-shaped rotary body 11, axial line 22 (shown in FIG. 4) of the ring body 12 is eccentric against axial line 23 of the roller-shaped rotary body 11 by the same dimension and being oblique by the same angle. In the aspect of eccentric direction of the axial line 22, adjoining axial lines respectively deviate themselves by 120°. In the aspect of phase of inclined angle of axial lines, adjoining phases respectively deviate themselves by 120°.

Figure 3:
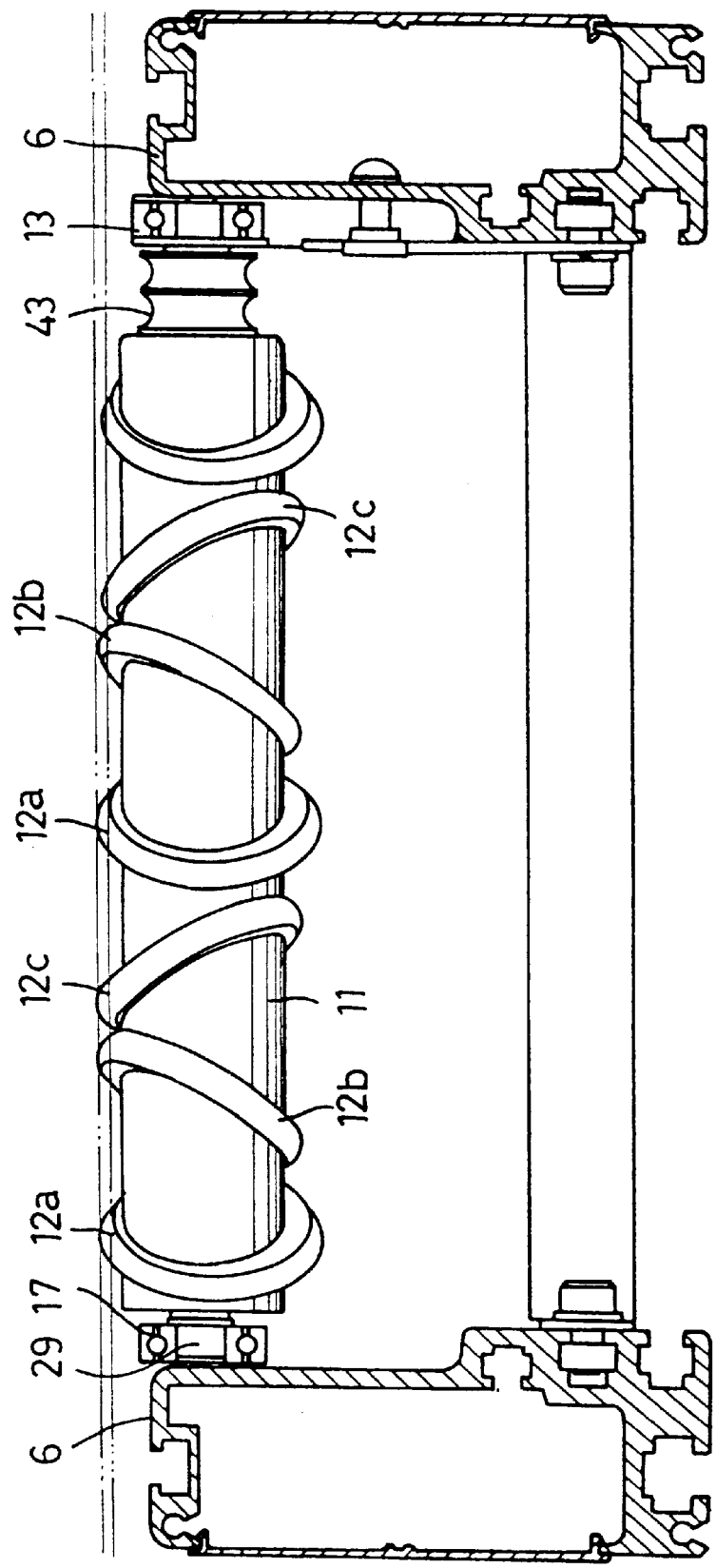
FIG. 3 is an A-directional cross-sectional view of the conveying installation shown in FIG. 1.

Accordingly, the ring bodies assume identical postures at every three intervals. Assume that the center ring body shown in FIG. 3 is 12a followed by rightward ring bodies 12b and 12c in sequence, positional relationship between the ring bodies 12 and the roller-shaped rotary body 11 is further described below.

References (a), (b), and (c) shown in FIG. 4 respectively designate positional relationship between the ring bodies 12a, 12b, 12c, and the roller-shaped rotary body 11 at a certain moment. Reference (d) shown in FIG. 4 designates aspects of the ring bodies 12a, 12b, and 12c, seen from arrowed directions shown in FIGS. 4(a), 4(b), and 4(c), where the ring bodies 12a, 12b, and 12c, respectively turn into an identical form. Solid lines shown in FIGS. 4(a), 4(b), 4(c), and 4(d) respectively designate the ring bodies 12a, 12b, and 12c, whereas double-dot chained lines respectively designate the roller-shaped rotary body 11.

As is apparent from FIG. 4, cores 20 of the ring bodies 12a, 12b, and 12c, are respectively eccentric against core 21 of the the roller-shaped rotary body 11 by an amount "h". Eccentric amounts "h" of the ring bodies 12a, 12b, and 12c, are identical to each other. It is recommended that 2% through 20% of the eccentric amount "h" be secured against the roller-shaped rotary body 11, preferably 5% through 15% be secured.

Eccentric directions of the axial lines 22 of respective ring bodies 12a, 12b, and 12c, are deviant from each other by 120° of phasewise difference. Concretely, in the case of a certain moment shown in FIG. 4, the ring body 12a is eccentric in the direction of 3 o'clock (90°), whereas the ring body 12b is eccentric in the direction of 7 o'clock (210°), and the ring body 12c is eccentric in the direction of 11 o'clock (330°), respectively.

The axial lines 22 (shown in FIG. 4d) of the ring bodies 12a, 12b, and 12c, are respectively inclined by 30° from the axial line 23 of the roller-shaped rotary body 11. Accordingly, the ring bodies 12a, 12b, and 12c, are respectively inclined by 60° against axial line of the roller-shaped rotary body 11.

Figures viewing the ring bodies 12a, 12b, and 12c, from specific directions are common to each other as shown in FIG. 4(d). This is because respective ring bodies are observed by varying the viewing directions by 120°. Adjoining phases of inclined angles of axial lines of the ring bodies 12a, 12b, and 12c, are deviant from each other by 120°.

Since the axial lines of the ring bodies 12 are inclined, when rotating the roller-shaped rotary body 11 based on the posture shown in FIG. 4(*d*) as reference, the ring bodies 12 contactably rotate themselves, and then the uppermost point of the ring bodies 12 shifts to one side of the axial direction of the roller-shaped rotary body 11 at the time of making an initial turn by 180°, whereas the uppermost point of the ring bodies 12 shifts to the direction inverse from the axial direction of the roller-shaped rotary body 11.

Detailed structure of the roller-shaped rotary body 11 such as inserted structure of the ring bodies 12 and structure of the roller-shaped rotary body 11 corresponding to the portions for inserting the ring bodies 12 therein are optional. However, in this embodiment, in order to promote interchangeability of parts, every component is made by means of block members.

Concretely, in this embodiment, the roller-shaped rotary body 11 comprises three kinds of block member including a tip-portion block member 26, an intermediate block member 27, and a rear-end portion block member 28. The ring bodies 12 are secured between these block members. A shaft core 29 is inserted through the rotary body 11.

The above block members are formed via injection molding of synthetic resins such as polyacetal resin, polyethylene resin, polypropylene resin, or ABS resin.

Figure 7:
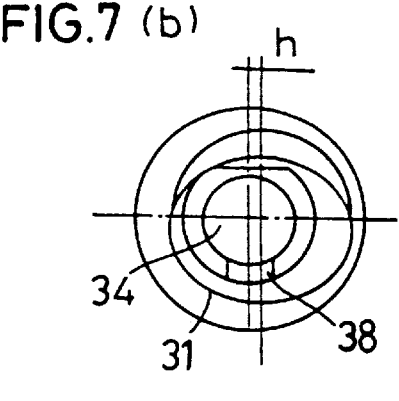
FIG. 7(a) is a front view of the block member at the intermediate portion of the roller-shaped rotary body shown in FIG. 2.
FIG. 7(b) is a left-side cross-sectional view of said block member.
FIG. 7(c) is a right-side cross-sectional view of said block member.
FIG. 7(d) is a B-directional arrowed view shown in the left-side cross-sectional view FIG. 7(b)
Figure 7:
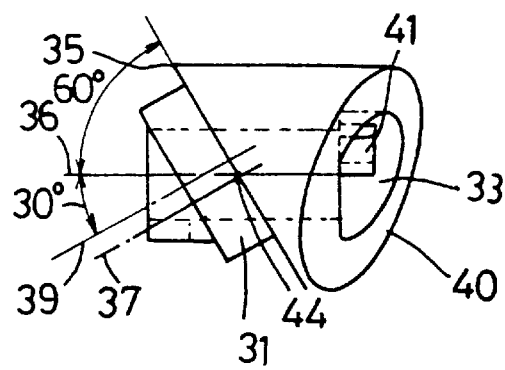
Figure 7:
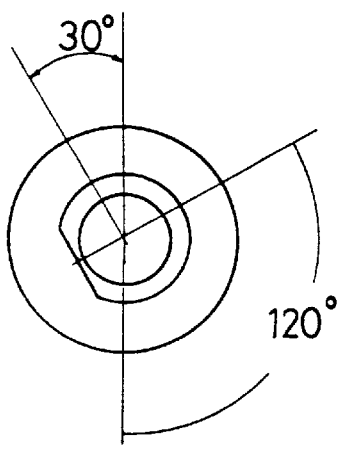
Figure 7:
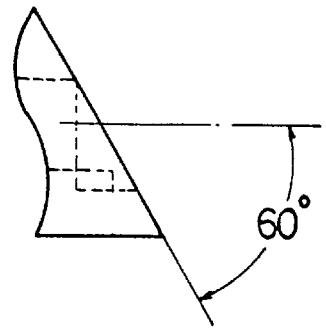
Figure 8:
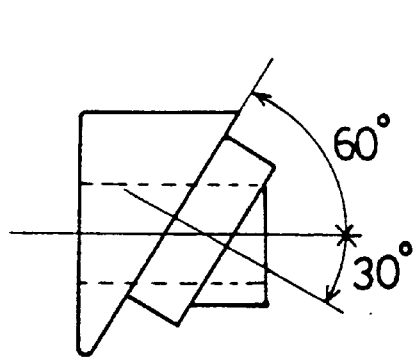
FIG. 8(a) is a front view of a block member at the rear edge of the roller-shaped rotary body shown in FIG. 2.
FIG. 8(b) is a right-side cross-sectional view of said block member.
Figure 8:
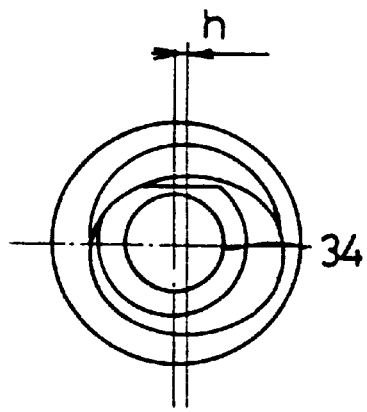
Figure 9:
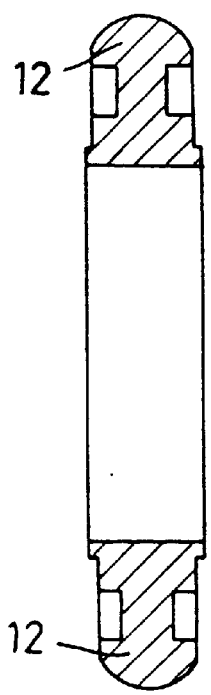
FIG. 9 is a cross-sectional view of the ring body.

Structure of the intermediate block member 27 is described below. The intermediate block member 27 has a shape shown in FIG. 5 and FIG. 7, which comprises a main body 30, a ring-body mountable portion 31, and male/female couplers 32/33, by way of integrating them altogether. A through-hole 34 is formed in the center of the intermediate block member 27.

The main body 30 of the intermediate block member 27 forms external peripheral portion of the roller-shaped rotary body 11. The main body 30 has a cylindrical external surface. However, in order to facilitate rotation of the ring bodies 12, both ends of the main body 30 are obliquely scraped off. Concretely, as shown in FIG. 5(*a*) and FIG. 7(*a*), one-side surface 35 of the main body 30 is inclined by 60°, whereas the normal 37 is inclined by 30° against the axial line 36 of the main body 30.

The ring-body mountable portion 31 is vertically formed against the surface 35. The ring-body mountable portion 31 is of cylindrical shape having diameter narrower than that of the main body 30. Since the ring-body mountable portion 31 is perpendicular to the inclined surface 35, the ring-body mountable portion 31 is inclined by 60° against external circumferential surface of the main body 30. The axial line 39 of the ring-body mountable portion 31 does not pass through the center 44 of the inclined surface 35 of the main body 30, but the ring-body mountable portion 31 is eccentric against the main body 30.

The male coupler 32 is provided at the tip end of the ring-body mountable portion 31. The male coupler 31 is of cylindrical form being coaxial with the main body 30. A cutout portion 38 for positioning purpose is provided for the male coupler 32.

An inclined surface 40 is also formed on the other surface of the main body 30. The inclined surface 40 has an angle inclined against the main body 30, which is identical to that of the inclined surface 35. Nevertheless, the inclined surface 40 is not parallel with the inclined surface 31, and yet, both surfaces are 120° apart from each other in the positional relationship.

The female coupler 33 is provided for the inclined surface 40. As shown in FIG. 5(*b*) and FIG. 7(*a*), sectional surface of the female coupler 33 forms a circular recess having a dimension just enough to accommodate the male coupler 32 therein for coupling.

The female coupler 33 is provided with a positioning projection 41. The projection 41 is coupled with the cutout portion 38 of the male coupler 32. However, the projection 41 and the cutout portion 38 are not on the identical straight line, but both are provided at positions 120° apart from each other.

In this embodiment, only a single unit of the cutout portion 38 or the positioning projection 41 is provided for the male coupler 32 or the female coupler 33, and yet, both units are set to positions 120° apart from each other. Accordingly, in this embodiment, all the block members cannot be assembled in any state other than the state in which phases are apart from each other by 120°.

In order to prevent the above components from being assembled in any case other than the state in which phases are deviant by a predetermined amount, there is such a conceivable method to provide recesses and projections for respective coupling portions at different intervals so that these recesses and projections can be deviated from each other at the male/female coupling portions of the block members by a predetermined angle.

In view of feasibility to prevent any error from occurrence in the course of assembly work, the above-described structure to implement coupling of the block members solely in the positional relationship under deviation by predetermined phases is recommended. However, this method is not always essential for embodying the invention.

Figure 6:
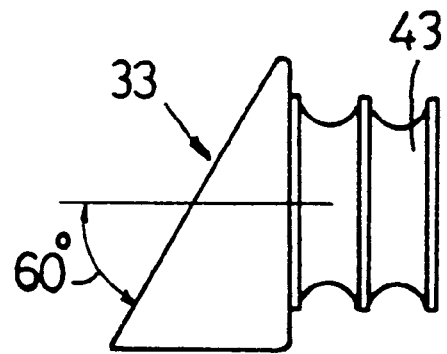
FIG. 6(a) is a front view of the block member at the tip portion of the roller-shaped rotary body shown in FIG. 2.
FIG. 6(b) is a left-side cross-sectional view of said block member.
FIG. 6(c) is a right-side cross-sectional view of said block member.
Figure 6:
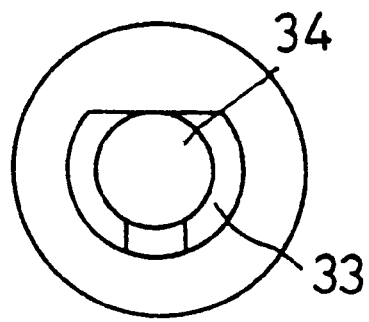
Figure 6:
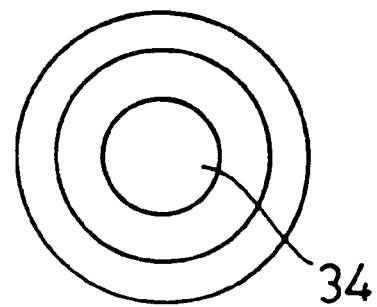

As shown in FIG. 5 and FIG. 6, the tip-end block member 26 is provided with a double pulley 43 functioning as a power transmission member. Concretely, the double pulley 43 is set to the tip portion of the tip-end block member 26. A main body 45 is provided in the state of being linked with the double pulley 43. The other edge surface of the main body 45 is obliquely formed. The female coupler 33 is secured to the oblique surface of the main body 45. Note that both the oblique surface and the female coupler 33 of the tip-end block member 26 are exactly identical to those of the intermediate block member 27.

Accordingly, it may be taken that the tip-end block member 26 has a configuration by way of replacing the ring-body mountable portion 31 and the male coupler 32 of the intermediate block member 27 with the double pulley 43. A through-hole 34 is formed through the center of the tip-end block member 26.

The rear-end portion block member 28 comprises a main body 47, a ring-body mountable portion 31, and a male coupler 32, and yet, a through-hole 34 is formed through the center of the rear-end portion block member 28 as well.

One-end surface of the main body 47 is vertical, whereas the other end surface is obliquely formed like the intermediate block member 27. Both the ring-body mountable portion 31 and the male coupler 32 are set to the oblique surface of the main body 47. Structure of the ring-body mountable portion 31 and the male coupler 32 is exactly identical to those of the intermediate block member 27.

The ring body 12 is annularly formed with such material featuring minimum friction such as nylon for example. The ring body 12 has internal diameter having dimension just enough to permit the ring body 12 to smoothly rotate itself when the ring body 12 is externally secured to the ring-body mountable portion 31 such as the intermediate block member 27. On the other hand, external diameter of the ring body 12 is just enough to permit at least part of the ring body 12 to be externally exposed when externally being secured to the ring-body mountable portion 31.

In this embodiment, employable ring body 12 has such a dimension to cause the whole circumference to be exposed on the external circumferential surface of the main body 45. However, in the case of introducing such a mechanism for causing part of the roller-shaped rotary body to provisionally support a commodity as will be described later on according to another embodiment shown in FIG. 12, it is desired that external circumference of the ring body be somewhat small.

The shaft core 29 is a round bar made from metal such as steel or resin. Generally, steel is used for composing the shaft core 29. However, in the case of conveying small load, use of resinous shaft core is recommended.

Next, in accordance with procedure for assembling the roller 10, a method of structuring the roller-shaped rotary body 11 used for implementing the present embodiment is described below.

Initially, ring bodies 12 are secured to the ring-body mountable portions 31 of the rear-end block member 28 and the intermediate block member 27. Next, while this condition remains, a number of intermediate block members 27 are nipped between the tip-end block member 26 and the rear-end block member 28, and then the male couplers 32 are respectively coupled with the female couplers 33. Since the number of the intermediate block member 27 is optional, by increasing or decreasing the number of the intermediate block member 27, the roller-shaped rotary body 11 can compatibly match commodity conveying facilities having a variety of width.

The male coupler 32 and the female coupler 33 are provided with a positioning cutout portion 38 and a positioning projection 41. Unless both the cutout portion 38 and projection 41 are coupled with each other, the male coupler 32 cannot be coupled with the female coupler 33. In the intermediate block member 27, the male coupler 32 and the female coupler 33 are set to positions 120° apart from each other. Accordingly, adjoining block members are coupled with each other in the state being deviant from each other by 120°.

As was described above, the ring body 12 is in the state being secured to the ring-body mountable portion 31. The ring body 12 is rotatable within a groove formed by the inclined surface 35 of the intermediate block member 27 and the inclined surface 40 of another intermediate block member 27.

Through-holes 34 in the center of respective block members are interlinked with each other to form a continuous through-hole in the center thereof. The shaft core 29 is inserted through the continuous through-hole 34. As shown in FIG. 3, the shaft core 29 is supported by the frame 6 via the bearing 13, where the shaft core 29 shoulders bending moment mainly loaded on the roller 10.

The roller-shaped rotary body 11 completed with assembly has a configuration shown in FIG. 2. Positional relationship between the ring body 12 and the roller-shaped rotary body 11 is specified below. Axial line of the ring body 12 is eccentric against axial line of the roller-shaped rotary body 11 by the same dimension and inclined by the same angle. Eccentric directions of axial lines of adjoining ring bodies 12 are deviant from each other by 120°, and yet, phases of inclined angles of axial lines of adjoining ring bodies are also deviant from each other by 120°.

Next, practical operation of the conveying installation according to this embodiment is described below.

In the conveying installation based on this embodiment, power from a motor (not shown) is transmitted to rollers 8 and 10 to cause them to rotate themselves in the arrowed direction C. Commodities (not shown) placed on the conveyer installation are conveyed in the arrowed direction D shown in FIG. 1, in other words, towards longitudinal downstream direction. In the event of introducing motor built-in rollers 8, provision of discrete motors for driving the rollers 8 is not needed. In the case of rotating rollers 10, it is also practicable to receive power from neighboring rollers 8 via belts for example.

A large number of commodities are conveyed from the upstream side to the downstream side via branched portions 4 provided with the rollers 10. Although commodities are subject to some shaky movement while passing through the branched portions 4, they are conveyed towards the downstream side without delay. Concretely, although the ring bodies 12 are respectively capable of allowing free turns, they have a certain amount of friction force. This is because, according to this embodiment, the ring bodies 12 are respectively secured to the roller-shaped rotary body 11 in the state being inclined by 60°, and thus, they can bear force in the longitudinal direction to some extent.

Whenever discharging specific commodities from the main conveying portion 2 to the sub-conveying portion 3, an obstructing object 56 is placed on the main conveying portion 2 to compulsorily halt commodities on the rollers 10 provided for the branched portion 4. When this condition is entered, the rollers 10 still rotate themselves.

The relationship between commodities 60 and the ring bodies 12 of respective rollers 10 is represented in FIG. 10(a) for example. In this relationship, among those ring bodies 12a, 12b, and 12c, being in three phases, only the ring body 12a projects itself in the direction of commodities 60 by way of pushing them upward. Concretely, although positions of axial lines of the three ring bodies are respectively eccentric, since the eccentric directions are deviant from each other by 120°, in accordance with rotating angle of the roller-shaped rotary body 10, any of those ring bodies 12 in a specific posture further projects from other two ring bodies in two different postures in the direction of commodities 60. Actual state shown in the drawing represents that the eccentric direction of axial line of the ring body 12a is closest to perpendicularity in the upward direction, and thus the ring body 12a projects itself in the direction closest to commodities 60.

As a result of upward projection of the ring body 12a, commodities 60 are solely supported by the ring body 12a, whereas there is clearance between other ring bodies 12b/12c and commodities 60. When this condition is present, the ring body 12a can rotate itself without effect against the roller-shaped rotary body 11, and thus, the ring body 12a halts its rotation.

Figure 10:
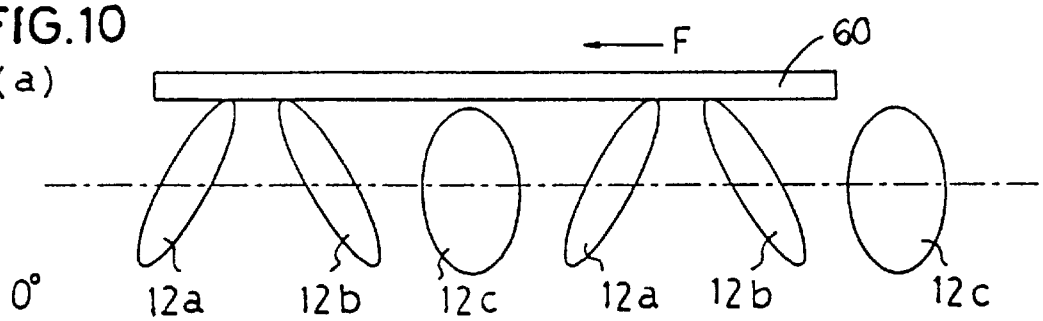
FIG. 10 is explanatory of operation of the conveying installation shown in FIG. 1.
Figure 10:
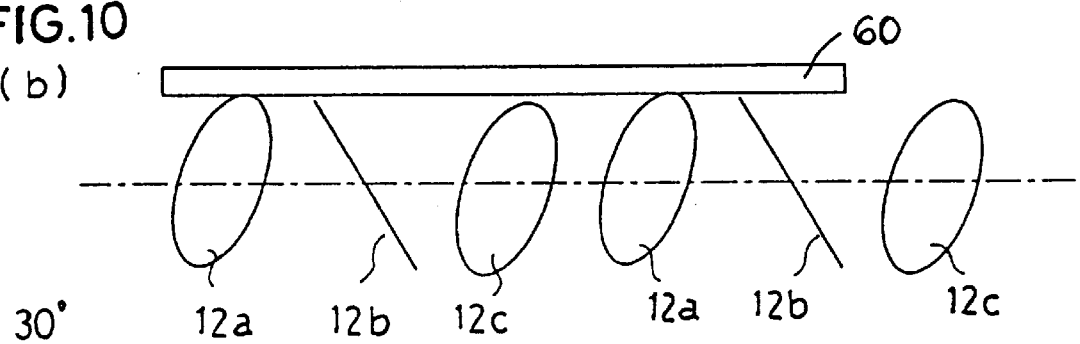
Figure 10:
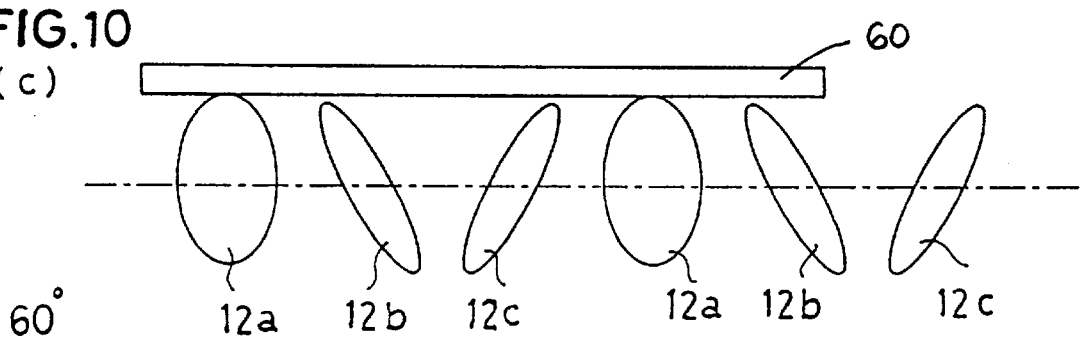
Figure 10:
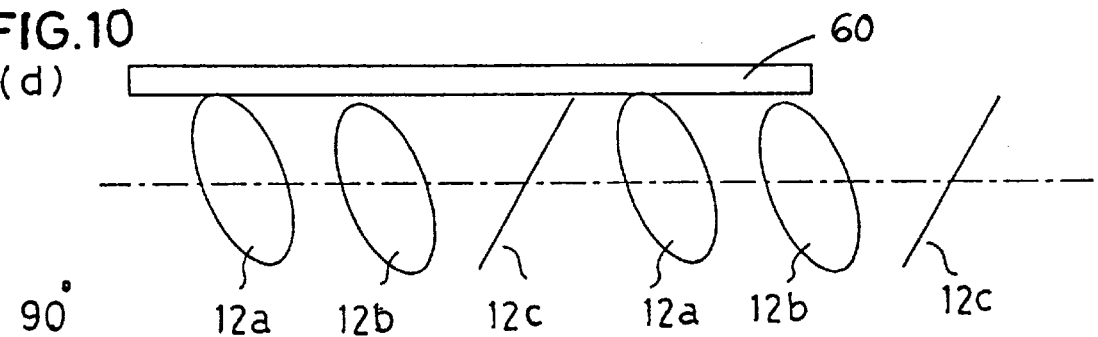

When sequence further proceeds from the above condition to the states shown in FIGS. 10(a), (b), (c), and (d) via further rotation of the roller-shaped rotary body 11, even though the ring body 12a halts absolute rotation, the ring body 12a still makes rotation relative to the roller-shaped rotary body 11. Since the ring body 12a is tilted against the roller-shaped rotary body 11, contact point between the ring body 12a and commodities 60 shifts in the arrowed direction F. Accordingly, commodities 60 are conveyed in the arrowed direction F. More concretely, when the ring body 12a supports commodities 60, according to the front view, the upper part of the ring body 12a shown in FIG. 10(a) is inclined to the right. However, in accordance with rotation of the roller-shaped rotary body 11, the ring body 12a shifts its posture into the state in which the upper part is inclined to the left. In consequence, in response to varied posture of the ring body 12a, commodities 60 held by the ring body 12a shift themselves to the left shown in FIG. 10.

In other words, after coming into contact with commodities 60, the ring body 12a solely varies its posture without rotating itself to shift commodities 60 in the axial direction of the rollers 10, i.e., in the lateral direction against the conveying direction of the main conveying portion 2.

In response to the rotation of the roller-shaped rotary body 11, eccentric direction of axial line of the ring body 12a rotatably shifts in the downward direction. Relative to this movement, the ring body 12a also descends itself towards the roller-shaped rotary body 11.

According to this embodiment, since eccentric directions of adjoining axial lines are deviant from each other by 120°, when the ring body 12a descends by effect of the rotation of the roller-shaped rotary body 11, the adjoining ring body 12c projects itself to outgrow the ring body 12a, and thus, the commodities 60 are supported by the ring body 12c in place of the ring body 12a.

Since adjoining phases of inclined angles of respective ring bodies 12 are apart from each other by 120°, posture of the ring body 12c at the time of supporting commodities 60 varies from the posture when the ring body 12a held them. In other words, the ring body 12c assumes such a posture identical to that of the ring body 12a while it still held the commodities 60. Concretely, in the front view, when the ring body 12c supports commodities 60, the ring body 12c is in the state being inclined to the right in FIG. 10, and then, in response to the rotation of the rollers 10, the ring body 12c shifts its posture into the state being inclined to the left. As a result, commodities 60 held by the ring body 12c are further transferred to the left relative to varied posture of the ring body 12b.

Following descending movement of the ring body 12c, the ring body 12b projects itself. While the ring body 12a still supports commodities 60, according to the front view, the ring body 12b remains in the state in which the upper part thereof shown in FIG. 10(a) is inclined to the right, and then, in response to the rotation of the rollers 10, the ring body 12b varies its posture into the state in which the upper part thereof is inclined to the left. As a result, in response to the varied posture of the ring body 12b, commodities 60 supported by the ring body 12b are transferred to the left shown in FIG. 10.

Accordingly, commodities 60 sequentially shift themselves across the ring bodies 12a, 12c, and 12b before being discharged in the direction of the sub-conveying portion 3.

The above-described embodiment has introduced a system in which axial lines of the ring bodies 12 are inclined by 30° against axial line of the roller-shaped rotary body 11. Concretely, respective ring bodies are inclined by 60° against the roller-shaped rotary body 11. Although angle of incline of the ring bodies 12 is optional, it is desired that wider angle of incline be introduced because the greater the inclined angle, the greater the shiftable amount in the lateral direction. When providing a substantial angle of incline for the ring bodies 12, they can better move straight while no obstructing object is put against commodities, and thus, provision of a substantial angle of incline is recommended.

On the other hand, when the ring bodies 12 are provided with a substantial inclined angle, length of the roller-shaped rotary body 11 occupied by an individual ring body 12 becomes longer, and thus, in the case of providing a plurality of ring bodies by way of providing a plurality of phasewise differences as is done for this embodiment, it is essential that distance between adjoining ring bodies be extended. Because of this, there is problem in that the number of installable ring bodies is inevitably decreased.

Accordingly, it is ideal for this embodiment to provide the ring bodies 12 with substantially 60° of inclined angle against the roller-shaped rotary body 11.

This embodiment has introduced such a system in which inclined angles and the eccentric directions of respective ring bodies 12 are respectively deviant from each other by 120°, and yet, phases are also deviant from each other by 120°. It should be understood however that 120° of phasewise amount is optional, and thus, said amount may be 90° or 45° for example. Even any fractional inclined angle such as 48° for example may also be applied.

Note that the less the phasewise differences, the longer the duration of causing the ring bodies 12 to remain in contact with commodities 60. This eliminates dead point from performance of commodities 60 to enable them to behave smoothly. Note that the greater the diameters and inclined angles of the ring bodies 12, the faster the speed of conveying commodities 60. For example, in the case of providing the ring bodies 12 with 40 mm of diameter, 30° of the incline of axial line against axial line of the roller-shaped rotary body 11, and 120° of phasewise difference, shiftable amount per round of the roller-shaped rotary body 11 is 40 mm.

Moving direction of commodities 60 is changeable by changing the rotating direction of the roller-shaped rotary body 11. In addition, moving direction of commodities 60 is also changeable by changing inclined direction of the ring bodies 12.

Concretely, in the preceding embodiment, axial lines 22 of respective ring bodies 12a, 12b, and 12c, are respectively inclined by 30° apart from axial line 23 of the roller-shaped rotary body 11. On the other hand, commodities 60 can be shifted to the right by way of inversely inclining the axial lines 22 of the ring bodies 12a, 12b, and 12c, by −30° from the axial line 23 of the roller-shaped rotary body 11.

In other words, in the preceding embodiment, as shown in FIG. 10, according to the front view, angle of incline and eccentric position are set in order that the upper portion of respective ring bodies 12 can be inclined in the rightward direction when any of them projects in the direction of commodities 60. On the other hand, commodities 60 ate shifted to the direction inverse from that of the preceding embodiment by way of setting angle of incline and eccentric position of the ring bodies 12 so that the upper portion thereof can be inclined in the leftward direction when any of the ring bodies 12 projects in the direction of commodities 60.

According to the invention, even though phasewise difference between the ring bodies 12 is not provided, commodities 60 can be discharged. However, in the case of such a structure without providing phasewise difference between the ring bodies 12, shiftable amount of commodities extremely decreases. When no phasewise difference is provided for the ring bodies 12, in order to facilitate smooth transfer of commodities from a specific ring body to another ring body, it is desired that care be exercised to provide idling ring-bodies.

Figure 11:
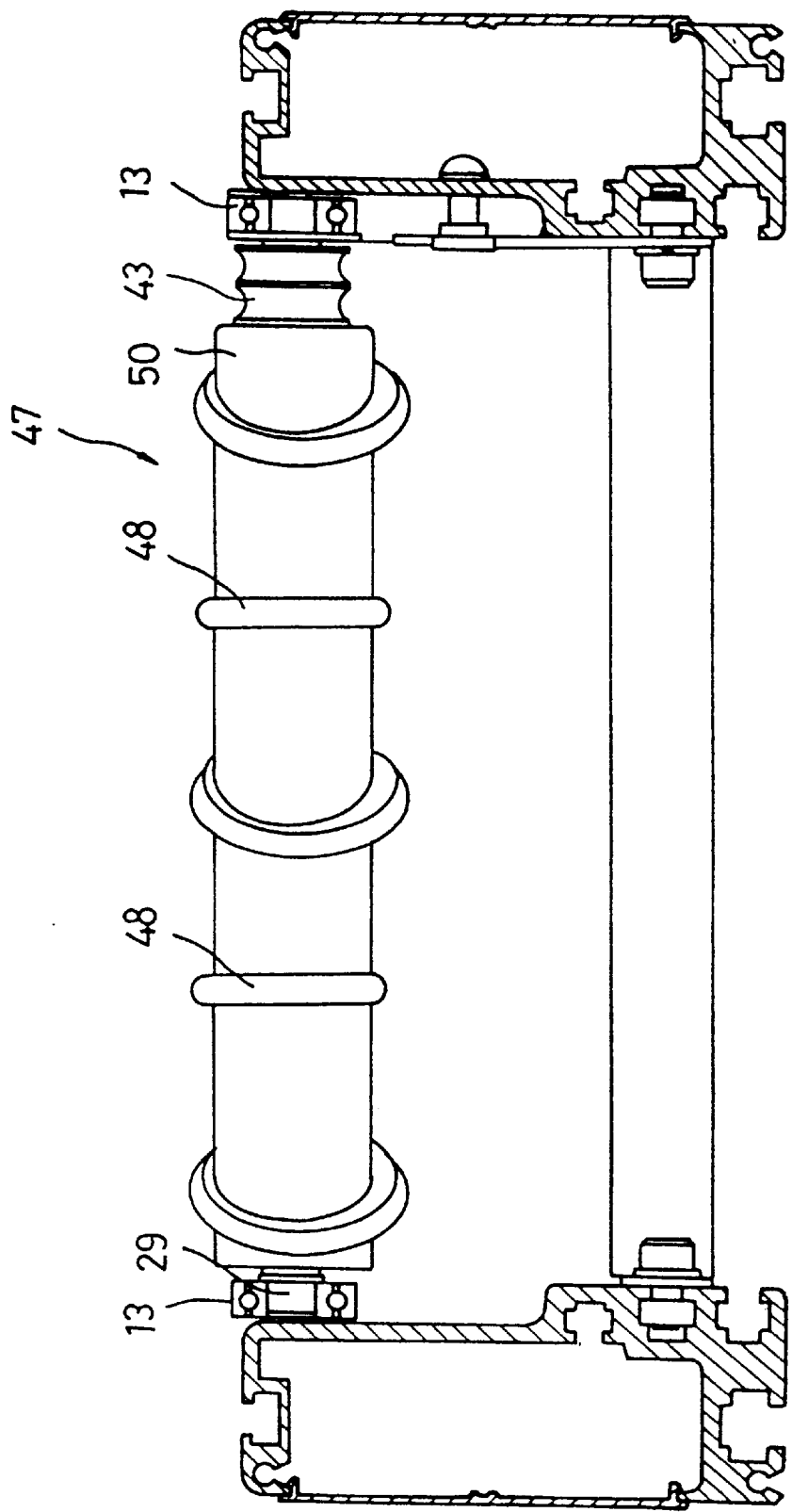
FIG. 11 is a cross-sectional view of another embodiment of the invention corresponding to FIG. 3.

The conveying installation 47 shown in FIG. 11 represents a structure capable of facilitating smooth transfer of commodities by way of providing idling ring-bodies 48. Among components of the conveying installation 47 shown in FIG. 11, those which are identical to the one used for the preceding embodiment are expressed by identical reference numerals.

A roller-shaped rotary body 50 of the conveying installation 47 is provided with three ring bodies 12. These ring bodies 12 are respectively provided with angles of incline and amount of eccentricity being exactly identical to those which are provided for the preceding embodiment. However, this embodiment does not provide any of the ring bodies 12 with phasewise difference, and thus, the three ring bodies 12 constantly remain in the identical posture.

A pair of idling ring-bodies 48 are provided between the operating ring bodies 12. The idling ring-bodies 48 respectively permit the roller-shaped rotary body 11 to perform relative rotation. The idling ring-bodies 48 are respectively coaxial with the roller-shaped rotary body 11, but neither of them is provided with eccentricity nor incline.

Each of the idling ring-bodies 48 has a diameter at least wider than that of the roller-shaped rotary body 11. It is quite important to note that external circumference of the idling ring-bodies 48 is smaller than the rotational locus of the position at which any of the ring bodies 12 projects utmost, and yet, greater than the rotational locus of the position at which any of the ring bodies 12 subsides utmost.

After loading commodities on the conveying installation 47 related to this embodiment, while rotating the roller-shaped rotary body 11, when compulsorily halting shift of commodities in the longitudinal direction, each commodity is pushed up by any of the ring bodies 12, and then, in response to the rotation of the roller-shaped rotary body 11, the commodity shifts itself in the lateral direction. The ring bodies 12 respectively cause commodities to be shifted in one direction while the roller-shaped rotary body 11 makes a half turn. However, if the roller-shaped rotary body 11 keeps on rotating itself while the commodities are still held by the ring bodies 12, the commodities will be back to the original position when the roller shaped rotary body 11 makes the following half turn.

This embodiment however provides a pair of idling ring bodies 48, wherein external circumference of each idling ring body 48 is smaller than rotational locus of the position at which any of the ring bodies 12 projects utmost, and yet, greater than rotational locus of the position at which any of the ring bodies 12 subsides utmost.

Accordingly, when the roller-shaped rotary body 11 remains being subsided, the idling ring-bodies 48 project themselves above height of the roller-shaped rotary body 11, and thus, commodities are provisionally supported by the idling ring-bodies 48. This prevents commodities from being brought back to the original position by the half-turn of the ring bodies 12.

This embodiment has exemplified the idling ring-bodies 48 devoid of eccentricity. However, even when the idling ring-bodies 48 respectively have eccentricity to some extent, identical effect can be secured.

Figure 12:
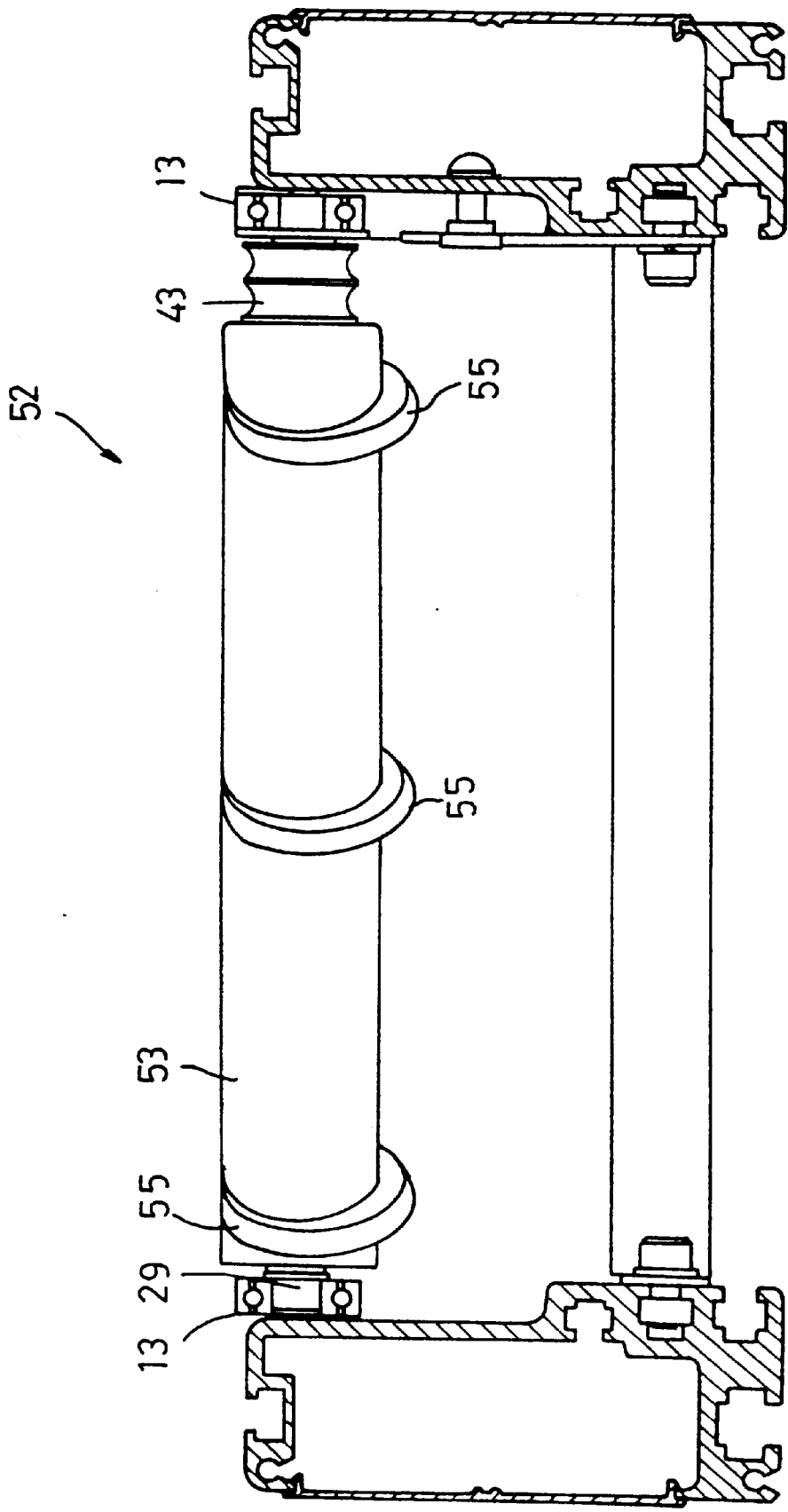
FIG. 12 is a cross-sectional view of another embodiment of the invention corresponding to FIG. 3.

The conveying installation 52 shown in FIG. 12 introduces another structure capable of facilitating smooth transfer of commodities. Among components of the conveying installation 52 shown in FIG. 12, those which are used for the preceding embodiments are expressed by identical reference numerals.

A roller-shaped rotary body 58 of the conveying installation 52 is provided with three ring-bodies 55. Each of the ring-bodies 55 has angle of incline being exactly identical to the inclined angle provided for the preceding embodiments. This embodiment does not provide phasewise difference for any of the three ring-bodies 55, and thus, the three ring-bodies 55 constantly remain in the identical posture.

According to this embodiment, amount of eccentricity of the ring-bodies 55 is greater than that is provided for the preceding embodiments. Because of this, part of any of the ring-bodies 55 fully subsides inside of groove of the roller-shaped rotary body 53.

After loading commodities on the conveying installation 52 related to this embodiment, when compulsorily halting shift of commodities in the longitudinal direction while keep on rotating the roller shaped rotary body 53, as was done for the preceding embodiments, commodities are pushed upward by any of the ring-bodies 55, and then, in response to the shift of the ring-bodies 55, commodities shift themselves in the lateral direction.

However, according to this embodiment, the ring-bodies 55 are respectively provided with a substantial amount of eccentricity to cause part of any of the ring-bodies 55 to be fully subsided inside of groove of the roller-shaped rotary body 53, and thus, when the roller-shaped rotary body 53 is at a specific rotational angle, the operating ring-body 55 subsides inside of the roller-shaped rotary body 53 and then leaves commodities, This prevents commodities from being brought back to the original position by effect of the half-turn of the ring body 55.

When the roller-shaped rotary body 53 further rotates itself, the following ring-body 55 again pushes commodities upward to cause them to be shifted in the lateral direction along the ring-body 55.

The above embodiments have respectively exemplified the use of a roller-shaped rotary body. However, it is also possible to make use of such a shaft-like rotary body having small rollers. When operating such a structure with small roller components, substantial clearance is generated between external circumferential portion and the roller components to minimize contact between commodities and the roller components, thus ideally being suited for conveying soft commodities.

The above embodiments have respectively been described by way of utilizing the inventive conveying installation as part of roller conveyer system as the major premise. However, it is also possible to dispose such a conveying installation having other conveying means such as a belt conveyer in place of a roller conveyer in the front and on the back of the inventive conveying installation.

Figure 13:
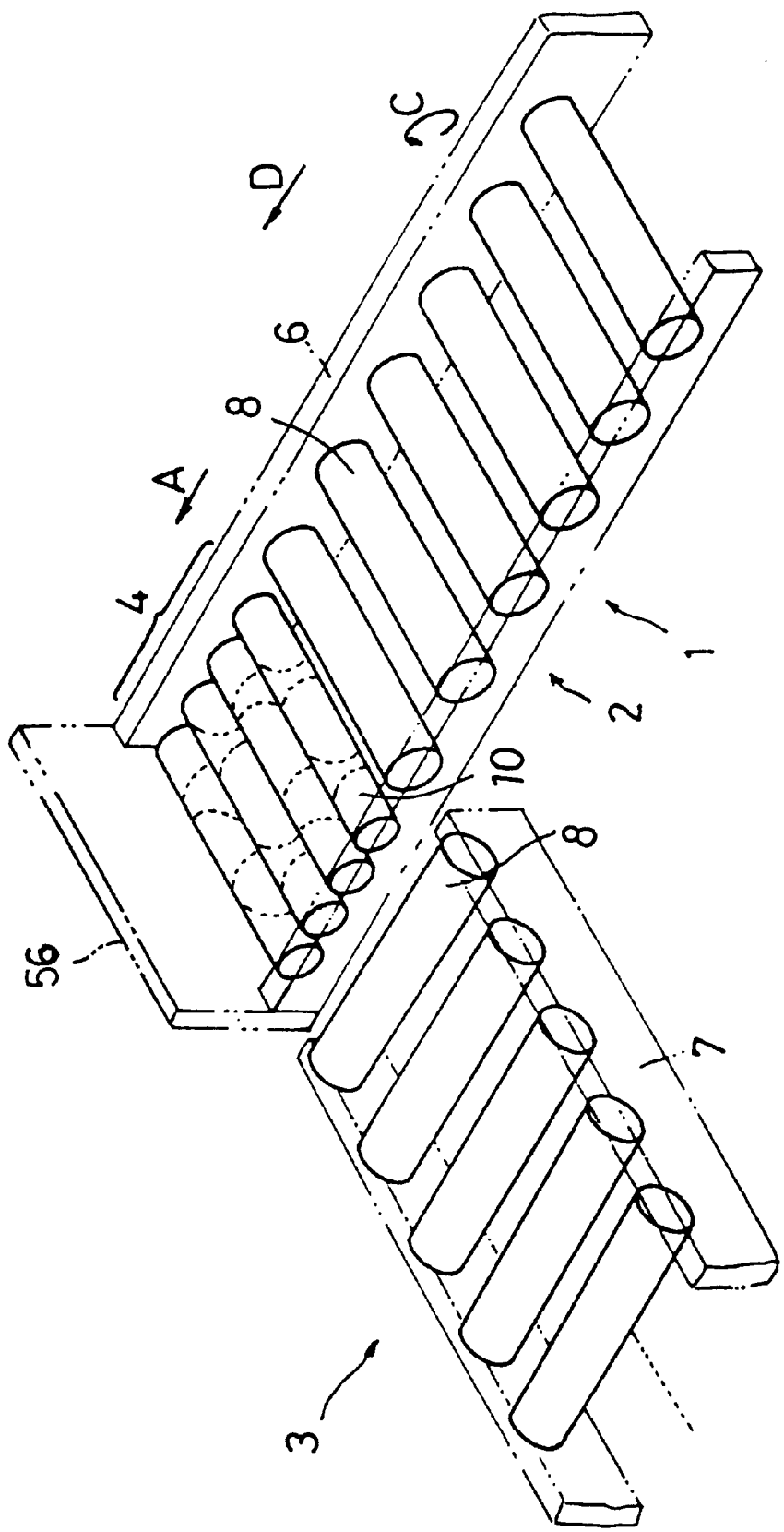
FIG. 13 is a perspective view of the conveying installation according to another embodiment of the invention.

Furthermore, it is also possible to set the inventive conveying installation at a corner portion of a conveying line shown in FIG. 13. According to the structure shown in FIG. 13, the conveying line can be folded orthogonally to provide an advantage in terms of minimizable space occupied by the conveying line.

Among components of the conveying installation shown in FIG. 13, those which are used for the embodiment shown in FIG. 1 are expressed by identical reference numerals, thus deleting further description of them.

The inventive conveying installation is not only capable of conveying commodities to downstream side of the conveying installation, but it is also capable of discharging commodities in the lateral direction by compulsorily halting them on the conveying system.

The inventive conveying installation is merely structured by way of securing ring bodies onto a shaft-like or roller-shaped rotary body to feature extremely simplified structure using a small number of component parts. Accordingly, the inventive conveying installation can easily be assembled to minimize mechanical failure as an advantageous effect.

The invention structures a rotary body by means of block members, whereby a rotary body can be fabricated by sequentially linking block members. The invention provides another advantageous effect in that rotary bodies having different lengths can be manufactured by increasing or decreasing the number of block members.

Furthermore, since block members are provided with positioning portions, they can be linked with each other in a variety of states comprising varied directions of eccentricity and angles of incline as another advantageous effect of the invention.

In addition, since the inventive art enables the center shaft core of the rotary body to shoulder bending moment incurring to respective rotary bodies to provide sufficient durability against heavy load as another advantageous effect of the invention.

What is claimed is:

1. A conveying installation comprising:
    a shaft-shaped or roller-shaped rotary body capable of rotating itself on receipt of power for conveying a commodity loaded thereon, said rotary body provided with at least one ring body rotatable relative to the rotary body, each of the at least one ring body having an axial line being eccentric and inclined relative to an axial line of said rotary body.

2. The conveying installation according to claim 1, wherein the rotary body has a center, the at least one ring body includes a plurality of ring bodies, each of the plurality of ring bodies, or groups thereof, having a different eccentric direction of axial line relative to the center of said rotary body, the plurality of ring bodies having different eccentric directions of axial lines being intermixedly provided in said rotary body.

3. The conveying installation according to claim 1, wherein the at least one ring body includes a plurality of ring bodies, each of the plurality of ring bodies, or groups thereof, having a different phase of inclined angle of axial line relative to the axial line of said rotary body, the plurality of ring bodies having different phases of inclined angle of axial lines being intermixedly provided in said rotary body.

4. The conveying installation according to claim 1, wherein the at least one ring body includes a plurality of ring bodies, each of the plurality of ring bodies, or groups thereof, having a different eccentric direction of axial line and a different phase of inclined angle of axial line relative to the axial line of said rotary body, the plurality of ring bodies having different eccentric directions and phases of inclined angle of axial lines being intermixedly provided in said rotary body.

5. The conveying installation according to claim 1, wherein said conveying installation is provided with an obstructing object for compulsorily halting shift of the commodity in a rotating direction of said rotary body.

6. The conveying installation according to claim 1, wherein said conveying installation is provided with ring bodies respectively being coaxial with said rotary body.

7. The conveying installation according to claim 1, wherein said conveying installation is provided with a main conveying portion making up a main flow and a sub-conveying portion branched from said main conveying portion.

8. The conveying installation according to claim 1, wherein said rotary body is structured by assembling block members, said block members respectively provided with an external circumferential portion coaxial with an axial line of said block members and a ring-body mountable portion having an external diameter narrower than said external circumferential portion and an axial line being eccentric and inclined against the axial lines of said block members, said block members having edge portions provided with coupling members to link respective block members via coupling of said coupling members at edge portions thereof, the at least one ring body secured to said ring-body mountable portion.

9. The conveying installation according to claim 8, wherein said conveying installation is provided with a main conveying portion making up a main flow and a sub-conveying portion branched from said main conveying portion.

10. The conveying installation according to claim 8, wherein the rotary body has a center, the at least one ring body includes a plurality of ring bodies, each of the plurality of ring bodies having a different eccentric direction of axial line relative to the center of said rotary body.

11. The conveying installation according to claim 8, wherein the at least one ring body includes a plurality of ring bodies, each of the plurality of ring bodies having a different phase of inclined angle of axial line relative to the axial line of said rotary body.

12. The conveying installation according to claim 8, wherein the at least one ring body includes a plurality of ring bodies, each of the plurality of ring bodies having a different eccentric direction of axial line and phase of inclined angle of axial line relative to the axial line of said rotary body.

13. The conveying installation according to claim 8, wherein said conveying installation is provided with an obstructing object for compulsorily halting shift of the commodity in a rotating direction of said rotary body.

14. The conveying installation according to claim 8, wherein said conveying installation is provided with ring bodies each being coaxial with said rotary body.

15. The conveying installation according to claim 8, wherein both ends of said block members are respectively provided with a positioning portion, where adjoining block members are linked with each other in a state in which eccentric directions and phases of inclined angles of said ring-body mountable portions are different from each other.

16. The conveying installation according to claim 8, wherein a through-hole is formed through the center of said block members, where a shaft core is inserted through a continuous through-hole formed by linkage of respective block members.

17. The conveying installation according to claim 8, further comprising a block member having a power transmission member, wherein said block member is set to an end of said rotary body.

18. The conveying installation according to claim 1, wherein the at least one ring body includes a plurality of ring bodies having axial lines inclined in a direction corresponding to a transport direction of the commodity.

19. A conveying installation comprising:
    a shaft-shaped or roller-shaped rotary body capable of rotating itself on receipt of power for conveying a commodity loaded thereon, said rotary body is provided with at least one ring body having an axial line that is eccentric and inclined relative to an axial line of said rotary body,
    wherein the rotary body has a center, the at least one ring body includes a plurality of ring bodies, each of the plurality of ring bodies, or groups thereof, having a different eccentric direction of axial line relative to the center of said rotary body, the plurality of ring bodies having different eccentric directions of axial lines being intermixedly provided in said rotary body.

20. A conveying installation comprising:

a shaft-shaped or roller-shaped rotary body capable of rotating itself on receipt of power for conveying a commodity loaded thereon, said rotary body is provided with at least one ring body having an axial line that is eccentric and inclined relative to an axial line of said rotary body, wherein the at least one ring body includes a plurality of ring bodies, each of the plurality of ring bodies, or groups thereof, having a different phase of inclined angle of axial line relative to the axial line of said rotary body, the plurality of ring bodies having different phases of inclined angle of axial lines being intermixedly provided in said rotary body.

21. A conveying installation comprising:

a shaft-shaped or roller-shaped rotary body capable of rotating itself on receipt of power for conveying a commodity loaded thereon, said rotary body is provided with at least one ring body having an axial line that is eccentric and inclined relative to an axial line of said rotary body, wherein the at least one ring body includes a plurality of ring bodies, each of the plurality of ring bodies, or groups thereof, having a different eccentric direction of axial line and a different phase of inclined angle of axial line relative to the axial line of said rotary body, the plurality of ring bodies having different eccentric directions and phases of inclined angle of axial lines being intermixedly provided in said rotary body.

22. A conveying installation comprising:

a shaft-shaped or roller-shaped rotary body capable of rotating itself on receipt of power for conveying a commodity loaded thereon, said rotary body is provided with at least one ring body having an axial line that is eccentric and inclined relative to an axial line of said rotary body, wherein said rotary body is structured by assembling block members, said block members respectively provided with an external circumferential portion coaxial with an axial line of said block members and a ring-body mountable portion having an external diameter narrower than said external circumferential portion and an axial line being eccentric and inclined against the axial lines of said block members, said block members having edge portions provided with coupling members to link respective block members via coupling of said coupling members at edge portions thereof, the at least one ring body secured to said ring-body mountable portion.

23. The conveying installation according to claim 22, wherein said conveying installation is provided with a main conveying portion making up a main flow and a sub-conveying portion branched from said main conveying portion.

24. The conveying installation according to claim 22, wherein the rotary body has a center, the at least one ring body includes a plurality of ring bodies, each of the plurality of ring bodies having a different eccentric direction of axial line relative to the center of said rotary body.

25. The conveying installation according to claim 22, wherein the at least one ring body includes a plurality of ring bodies, each of the plurality of ring bodies having a different phase of inclined angle of axial line relative to the axial line of said rotary body.

26. The conveying installation according to claim 22, wherein the at least one ring body includes a plurality of ring bodies, each of the plurality of ring bodies having a different eccentric direction of axial line and phase of inclined angle of axial line relative to the axial line of said rotary body.

27. The conveying installation according to claim 22, wherein said conveying installation is provided with an obstructing object for compulsorily halting shift of commodity in the rotating direction of said rotary body.

28. The conveying installation according to claim 22, wherein said conveying installation is provided with ring bodies each being coaxial with said rotary body.

29. The conveying installation according to claim 22, wherein both ends of said block members are respectively provided with a positioning portion, where adjoining block members are linked with each other in the state in which eccentric directions and phases of inclined angles of said ring-body mountable portions are different from each other.

30. The conveying installation according to claim 22, wherein a through-hole is formed through the center of said block members, where a shaft core is inserted through a continuous through-hole formed by linkage of respective block members.

31. The conveying installation according to claim 22, further comprising a block member having a power transmission member, wherein said block member is set to an end of said rotary body.

32. A conveying installation comprising:

a shaft-shaped or roller-shaped rotary body which is capable of rotating itself on receipt of power for conveying a commodity loaded thereon, said rotary body is structured by assembling block members, each of said block members having an external circumferential portion coaxial with an axial line of said block member and a ring-body mountable portion having an external diameter narrower than said external circumferential portion and an axial line being eccentric and inclined against the axial line of each block member, where couplers are provided at edge portions of respective block members to effect linkage of said block members by coupling said couplers at said edge portions, where adjoining block members are linked with each other in a state in which eccentric directions and phases of inclined angles of the ring-body mountable portions are different from each other, and the ring bodies are secured to said ring-body mountable portion.

33. A conveying installation comprising:

a plurality of rollers, wherein at least one of the plurality of rollers has a shaft-shaped or roller-shaped rotary body capable of rotating itself on receipt of power for conveying a commodity loaded thereon in a transport direction, said rotary body provided with a plurality of ring bodies rotatable relative to the rotary body, the plurality of ring bodies having axial lines inclined and eccentric relative to an axial line of said rotary body, wherein an upper portion of each of the plurality of ring bodies is inclined in (a) a first direction with the plurality of ring bodies projecting in a direction against the transport direction of the commodity, and (b) a second direction, different from the first direction, with the plurality of ring bodies projecting in a direction aligned with the transport direction of the commodity.

* * * * *